US012752474B2

(12) United States Patent
Ibrahim

(10) Patent No.: US 12,752,474 B2
(45) Date of Patent: Oct. 6, 2026

(54) APPARATUS AND METHOD FOR VINYL SHEET HEATING AND BENDING

(71) Applicant: American Regal Remodeling LLC, Wheaton, IL (US)

(72) Inventor: Arsalan Ibrahim, Wheaton, IL (US)

(73) Assignee: American Regal Remodeling LLC, Wheaton, IL (US)

( * ) Notice: Subject to any disclaimer, the term of this patent is extended or adjusted under 35 U.S.C. 154(b) by 297 days.

(21) Appl. No.: 18/591,446

(22) Filed: Feb. 29, 2024

(65) Prior Publication Data

US 2025/0073981 A1 Mar. 6, 2025

Related U.S. Application Data

(60) Provisional application No. 63/536,766, filed on Sep. 6, 2023.

(51) Int. Cl.
*B29C 53/04* (2006.01)
*B29C 53/00* (2006.01)
*B29C 53/84* (2006.01)
*B29K 27/00* (2006.01)
*B29L 31/00* (2006.01)

(52) U.S. Cl.
CPC .......... *B29C 53/043* (2013.01); *B29C 53/005* (2013.01); *B29C 53/84* (2013.01); *B29K 2027/00* (2013.01); *B29L 2031/732* (2013.01)

(58) Field of Classification Search
CPC ....... B29C 53/02; B29C 53/04; B29C 53/043; B29C 53/005; B29C 53/84
See application file for complete search history.

(56) References Cited

U.S. PATENT DOCUMENTS

| | | | | |
|---|---|---|---|---|
| 3,028,628 | A | 4/1962 | Rutherford | |
| 4,334,947 | A * | 6/1982 | Zaino | B29C 53/043 156/499 |
| 4,756,863 | A * | 7/1988 | Petershofer | B31F 1/0009 425/374 |
| 5,201,981 | A * | 4/1993 | Whiteside | B29C 51/16 156/286 |
| 11,572,695 | B2 | 2/2023 | Alkhafaji | |

(Continued)

FOREIGN PATENT DOCUMENTS

FR 2994883 A1 1/2015

OTHER PUBLICATIONS https://youtu.be/AIMLypPIKKw?si=R0cjGm9-LHB2A84Q, Dec. 21, 2022.

(Continued)

*Primary Examiner* — Thu Khanh T. Nguyen
(74) *Attorney, Agent, or Firm* — Howard B. Rockman; Rockman Videbeck & O'Connor

(57) ABSTRACT

A portable vinyl sheet bending apparatus having an arcuate assembly for contacting a plastic composite member and a frame having a substantially planar frame base member. The apparatus includes a heating assembly mounted within the frame of the machine to provide uniform heat to a plastic composite member such that the temperature of heat provided allows for the plastic composite member to become pliable. The arcuate assembly includes two cylindrical rotator bars and a rotatable arcuate arm member for arcuately forming an edge of the planar plastic composite member between and around the cylindrical rotator bars.

20 Claims, 9 Drawing Sheets

(56) References Cited

U.S. PATENT DOCUMENTS

| | | | |
|---|---|---|---|
| 11,873,645 | B2 | 1/2024 | Iannacone, III |
| 12,290,994 | B2 * | 5/2025 | Kani ..................... B29C 53/043 |
| 2020/0346482 | A1 | 11/2020 | Mendez et al. |
| 2021/0010272 | A1 | 1/2021 | Bodendorf et al. |
| 2022/0205248 | A1 | 6/2022 | Alkhafaji |
| 2022/0235557 | A1 | 7/2022 | Bodendorf et al. |
| 2022/0250304 | A1 | 8/2022 | Dipaula |

OTHER PUBLICATIONS https://www.youtube.com/shorts/ncBgmjAglhk, Jun. 4, 2023.
https://www.youtube.com/watch?v=A2GPW0Bw7lc, Feb. 1, 2023.
https://www.youtube.com/watch?v=QoUyZmTR_Ko, Jul. 23, 2023.
https://www.youtube.com/watch?v=k-X0yaUjQJs, Mar. 30, 2020.
https://www.youtube.com/watch?v=8ODecCzo1Ns, Nov. 3, 2020.
https://www.youtube.com/watch?v=wa8LByxaTMo, Jul. 23, 2023.
https://www.youtube.com/watch?v=beO2cilub7A, Nov. 2, 2019.
https://www.youtube.com/watch?v=PL-jYGKAJsg, Sep. 5, 2022.
https://www.youtube.com/watch?v=nsxJahkIMUA, Jan. 29, 2023.

* cited by examiner

APPARATUS AND METHOD FOR VINYL SHEET HEATING AND BENDING

CLAIM OF DOMESTIC PRIORITY

This application claims the benefit of previously filed U.S. Provisional Application No. 63/536,766, filed Sep. 6, 2023, which is incorporated in its entirety by reference herein, to the extent allowed by law.

FIELD OF THE INVENTION

The present invention relates generally to prefabricated stair components and stair tread finish systems. The present invention further relates to a device and method for making and using prefabricated and custom stair components including a stair tread, and a molded stair tread with a curved nose feature.

BACKGROUND OF THE INVENTION

A staircase, beyond its functionality, is a core architectural design feature found in both contemporary residential and commercial buildings. Each style decision will make a visual impact and statement cementing the character of a building. When designing or building a staircase, whether as part of a new construction or remodel, stairs and stair treads are two components of staircase design that can affect both appearance and safety. A stair tread, the horizontal component of a step upon which one walks, is available in a variety of materials, styles and finishes all of which contribute to the appearance and functionality of the staircase. A stair tread nosing is a portion of the tread that protrudes horizontally beyond the face of the riser, the riser being the vertical component of a step. Stair nose moldings are typically installed to enhance the appearance and durability of the staircase. Staircases are commonly fabricated from raw construction grade materials that are then covered with flooring materials such as wood, laminate, tile, and vinyl to accommodate individual desires.

Luxury vinyl plank (LVP) flooring is a popular type of flooring shown in perspective in FIG. 1 and is known in the prior art. LVP flooring is a category of thermoplastic-based flooring material having at least one core layer comprising a homogenous blend of polymeric material and inorganic filler in a resilient composite sheet member. Popular polymer-based composite sheets include luxury vinyl tile (LVT), luxury vinyl plank (LVP), stone plastic composite (SPC), and wood plastic composite (WPC). LVP flooring is typically composed of a layer of one or more thermoplastic polymer composite cores, padding, image layer attached to the core layer, and clear coat finish formed over the image layer. LVPs are available in various sizes, with most widths varying between 5 inches and 8 inches and lengths ranging between 36 to 48 inches and a range of thicknesses from 2 mm and 8 mm. Typically, LVPs include a locking mechanism that surrounds the planks and is for click locking adjacent planks together. Although LVP flooring is becoming increasingly popular with floor installers and homeowners for its endless design possibilities, easy installation, and budget-friendly cost, LVP flooring is susceptible to the problems of color matching a stair nosing and other similar moldings.

Although LVP flooring installation can be accomplished with ease throughout most areas of the home, economic and aesthetic issues arise when one seeks to install LVP flooring on non-planar structures such as staircases. Flooring manufacturers and installers have tried various methods and products for providing custom stair treads and stair nose pieces capable of matching corresponding wood grain patterns and colors to adjacent LVP flooring. A solution provided by flooring manufactures includes expensive, pre-made vinyl stair nose planks or custom specific and separately ordered, vinyl stair nose planks. Flooring planks, such as LVP, are typically manufactured together, at the same time, within the same factory ensuring a perfect match of wood grain pattern and color. However, stair nose planks are generally not manufactured at the same time or place as the corresponding flooring planks. Thus, the stair nose planks while they may closely match the corresponding flooring planks, will almost always have a noticeable difference in color and pattern due to manufacturing differences. Although prior art vinyl stair nose planks may match adjacent flooring closely, they almost always result in increased costs and noticeable differences in color and pattern. Flooring installers attempted to solve the problem by fabricating custom stair nose planks from traditional flooring planks installed in adjacent areas. By using LVPs that were fabricated at the same time, under the same conditions, flooring installers were able avoid the slight variations in color and pattern issues found above. Some common methods used to fabricate these custom stair nose planks can be found in the prior art and are described below.

One solution known in the prior art and described in U.S. Pat. No. 11,572,695 ('695 patent) involves the use of acrylic bending machines shown in FIG. 2*a* of the present application. One problem that occurs with using acrylic bending machines to form stair nose planks such as the one described in the '695 patent is the utilization of an infrared tube in an adjustable heating gap which applies direct heat along two separate bending locations. Application of heat only to the two bending locations leaves the surrounding plank stiff and susceptible to cracking.

Another commonly used method of making custom stair nose planks from standard flooring planks includes cutting grooves into floor planks and folding and gluing the plank to form a stair nose shape, shown in FIG. 2*b* of the present application, as described in U.S. Pat. No. 11,873,645 ('645 patent). Cutting, folding, and gluing stair nose planks using the methods described in the '645 patent requires an installer to utilize various tools, risks ruining the design of a plank, does not provide a stable stair nose as the adhesive can wear out, and does not produce a smooth nose curve.

Therefore, there is a desire and need for a one-piece stair tread that includes a rounded edge. There is also a need for a device capable of molding vinyl flooring in a consistent manner to provide uniform stair treads that match surrounding flooring planks.

A feature of the present invention is to provide a portable device for making a stair tread from LVP flooring having at least one curved edge.

Another feature of the present invention is a method for making a stair tread having at least one curved edge, where the method may use the device of the present invention.

Yet another feature of the present invention is to provide a molded one-piece stair tread having a curved edge as a part of the stair tread.

The present invention is described in one or more embodiments in the following description with reference to the figures, in which like numerals represent the same or similar elements. While the invention is described in terms of the best mode for achieving the invention's objectives, it will be appreciated by those skilled in the art that the description of the invention is intended to cover alternatives, modifications, and equivalents as may be included within the spirit and scope of the invention as defined by the appended claims and their equivalents as supported by the following disclosure and drawings.

SUMMARY OF THE INVENTION

The present invention is directed to a portable heating and bending apparatus for arcuately contouring at least one edge of a planer vinyl composite member such as a luxury vinyl plank for flooring. The apparatus includes a substantially planar frame base member and a heating assembly positioned over the frame base member to provide uniform heat to substantially the entire length of the vinyl composite member, such that the temperature of heat provided allows the vinyl composite member to become pliable. The present invention further includes an arcuate forming assembly comprised of two cylindrical rotator bars and a rotatable arcuate arm member for arcuately forming a curved edge or nose portion of the planar vinyl composite member between the cylindrical rotator bars and around the circumferential surface of one of the bars. The present invention further includes a pivoting assembly comprised of a rotatable forming member configured to hold the vinyl composite member in a secure vertical configuration during a cool-down portion of the forming apparatus.

DESCRIPTION OF PREFERRED EMBODIMENT

Figure 1:
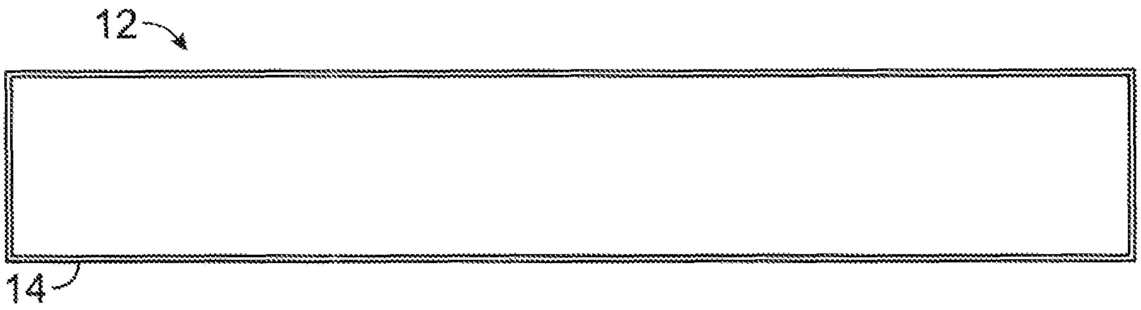
FIG. 1 illustrates a perspective view of a vinyl floor plank.

FIG. 1 illustrates a perspective view of a luxury vinyl plank (LVP) 12 as is known in the art, having a forward edge 14. In one embodiment, LVP 12 typically comprises a core, padding, an image layer, and a clearcoat finish, the latter providing visibility of the image layer. LVP 12 can, as one example, comprise a polymeric-based composite core material that can be softened for molding, such as at temperatures in the range of 50° C. to 180° C. Composite core material may include vinyl or non-vinyl plastics, prepared and mixed with other materials including fillers, plasticizers, binders, stabilizers, and pigments to form the composite member LVP 12 as is known in the art.

Figure 2A:
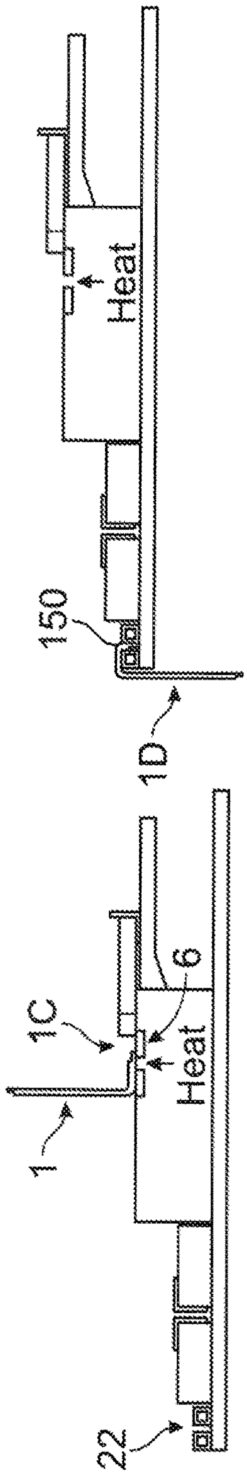
FIG. 2A (Prior Art)
FIGS. 2*a*-2*b* illustrate prior art vinyl floor plank bending methods and apparatus.
Figure 2B:
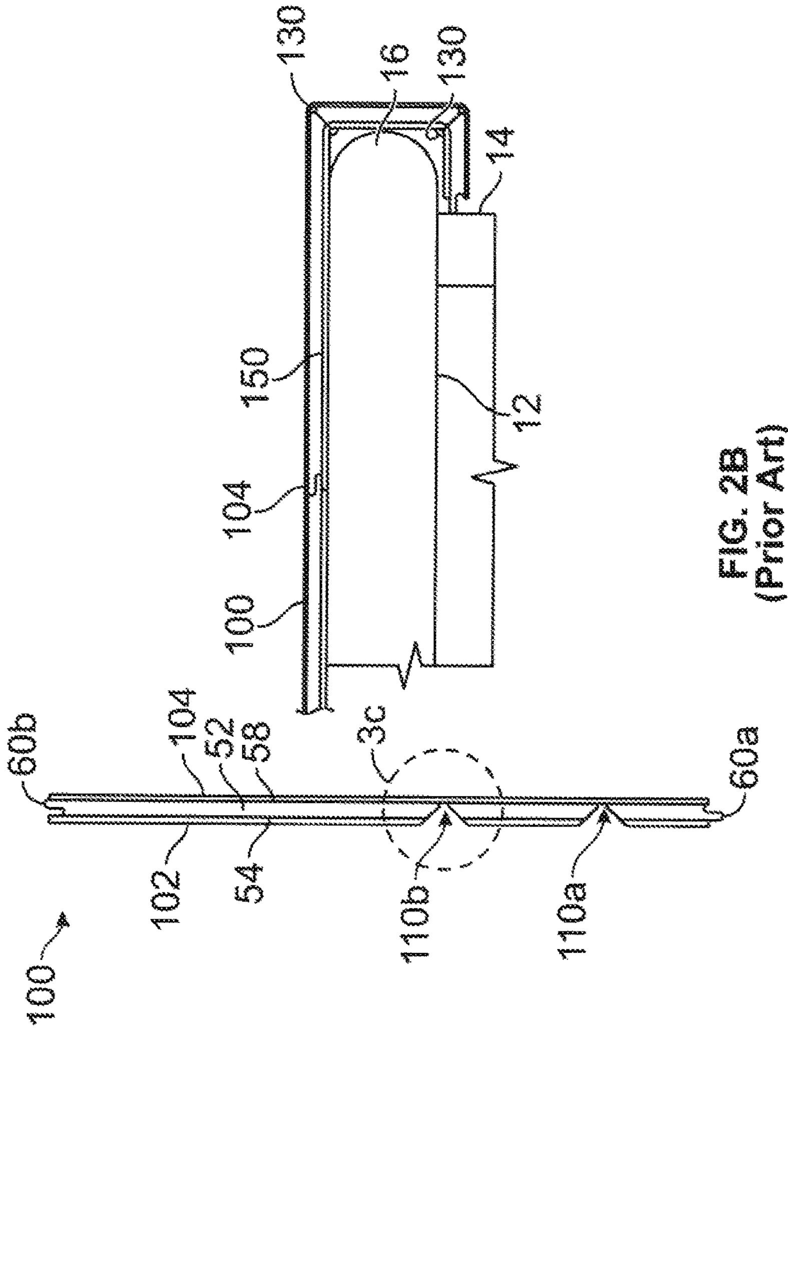
FIG. 2B (Prior Art)

FIGS. 2*a*-*b* illustrate prior art LVP bending methods and apparatus described in the '695 and '645 patents as discussed above.

Figure 3:
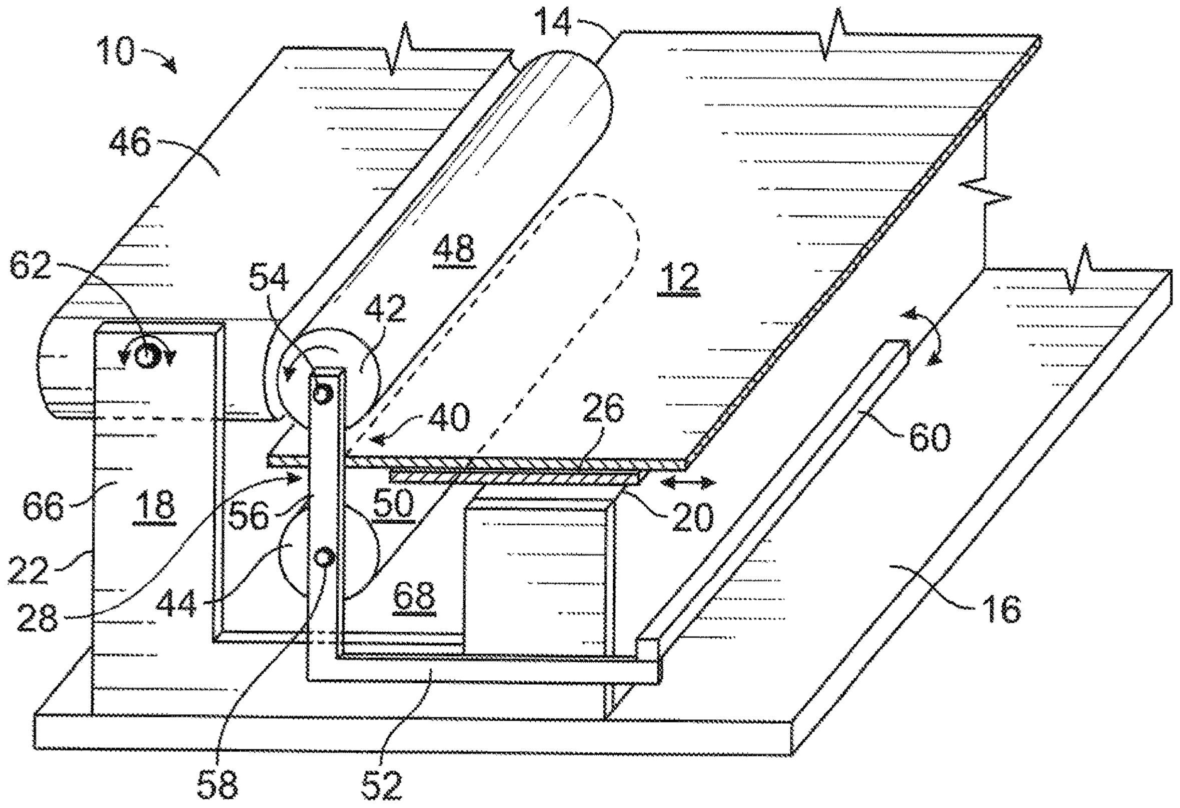
FIG. 3 is a perspective and detailed assembly view showing one end the arcuate roller structure of the present invention.
Figure 3A:
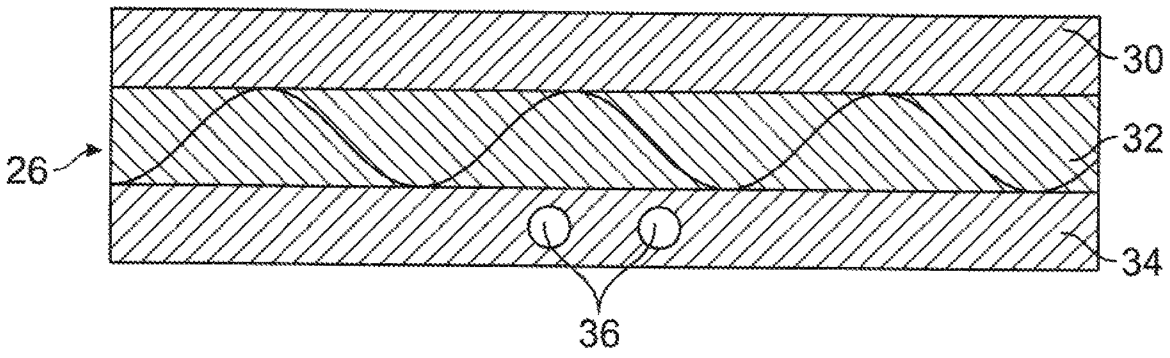
FIG. 3*a* is a cross-sectional detail view of the heat housing member and heating element.

FIG. 3 is a perspective end view of showing one view of the Vinyl Sheet Heating and Rounding Apparatus 10. Apparatus 10 is shown mounted on a supporting surface such as table 16 or some other substantially stabilizing planar surface for operation. Apparatus 10 is generally defined by frame member 18 having a substantially planar base member 20 and a pair of L-shaped end plates 22 and 24 (not shown), transversely displaced and affixed to opposing sides of frame member 18. The material used to make and join frame member 18 and end plates 22 and 24 are not critical to the invention and may comprise any suitable material known in the art.

Frame 18 of apparatus 10 encompasses a heat housing member 26 and roller assembly 28 mechanisms by which the bending of forward edge 14 of LVP member 12 is accomplished. Heat housing member 26 has an upper cover 30 disposed above a transversely directed heating element 32 and a lower cover 34, the lower cover 34 including a gripping member 36 designed to withstand a force provided to manually move the heat housing member 26 laterally when heating element 32 reaches a predetermined temperature within the LVP member's 12 temperature pliability range. Heating of LVP member 12 is initiated and controlled through thermostatic control of heating element 32 to a predetermined pliability temperature. Pliability of LVP member 12 may be between temperatures ranging between 50° C. to 180° C. depending upon the size and composition of the LVP member 12. When the specific pliability temperature of heating element 32 is reached, LVP member 12 is positioned onto and across the upper cover of 30 of heat housing member 26 with the forward edge 14 of the LVP member 12 wedged into a predetermined gap spacing 40 allowing uniform heat distribution throughout the LVP member 12. Upon sufficient heating of LVP member 12, the heat housing member 26 is manually horizontally displaced from base member 20 to prevent overheating LVP member 12 and accommodate rotational displacement of the roller assembly 28 to arcuately contour forward edge 14 of LVP member 12.

Frame 18 of apparatus 10 further comprises the roller assembly 28 which includes first and second rotatable cylindrical bars 42 and 44 and rotatable forming member 46 for arcuately forming forward edge 14 of LVP member 12. The first rotatable cylindrical bar 42 has an outer surface 48 longitudinally extending and rotatably coupled to end plates 22 and 24. The second rotatable cylindrical bar 44 has an outer surface 50 spaced a predetermined parallel distance from outer surface 46 of the first rotatable cylindrical bar 42 forming gap 40. Second rotatable cylindrical bar 42 is interchangeable for use with alternative bar sizes. First rotatable cylindrical bar 42 is rotatably mounted on axle 54 to linkage 56 at both ends of first rotatable cylindrical bar 42. Second rotatable bar 44 is rotatably mounted on axle 58 to linkage 56 at both ends of second rotatable cylindrical bar 44. Linkage 56 is attached to actuator arm 52 and operator handle 60. Linkage 56 is pivotally rotatable around axle 54 upon operation of the apparatus 10, as will be explained.

Gap 40 is adapted to receive a portion of LVP member 12 between outer surface 48 and 50 of rotatable cylindrical bars 42 and 44. Rotatable forming member 46 includes a pair of oppositely positioned pins 62 and 64 configured to secure LVP member 12 onto rotatable forming member 46 when displaced in a vertical configuration for the application of a cooling agent to LVP members 12. Pins 62 and 64 provide that forming member 46 is rotatable relative to upstanding flange portion 66 of frame 18.

Figure 4:
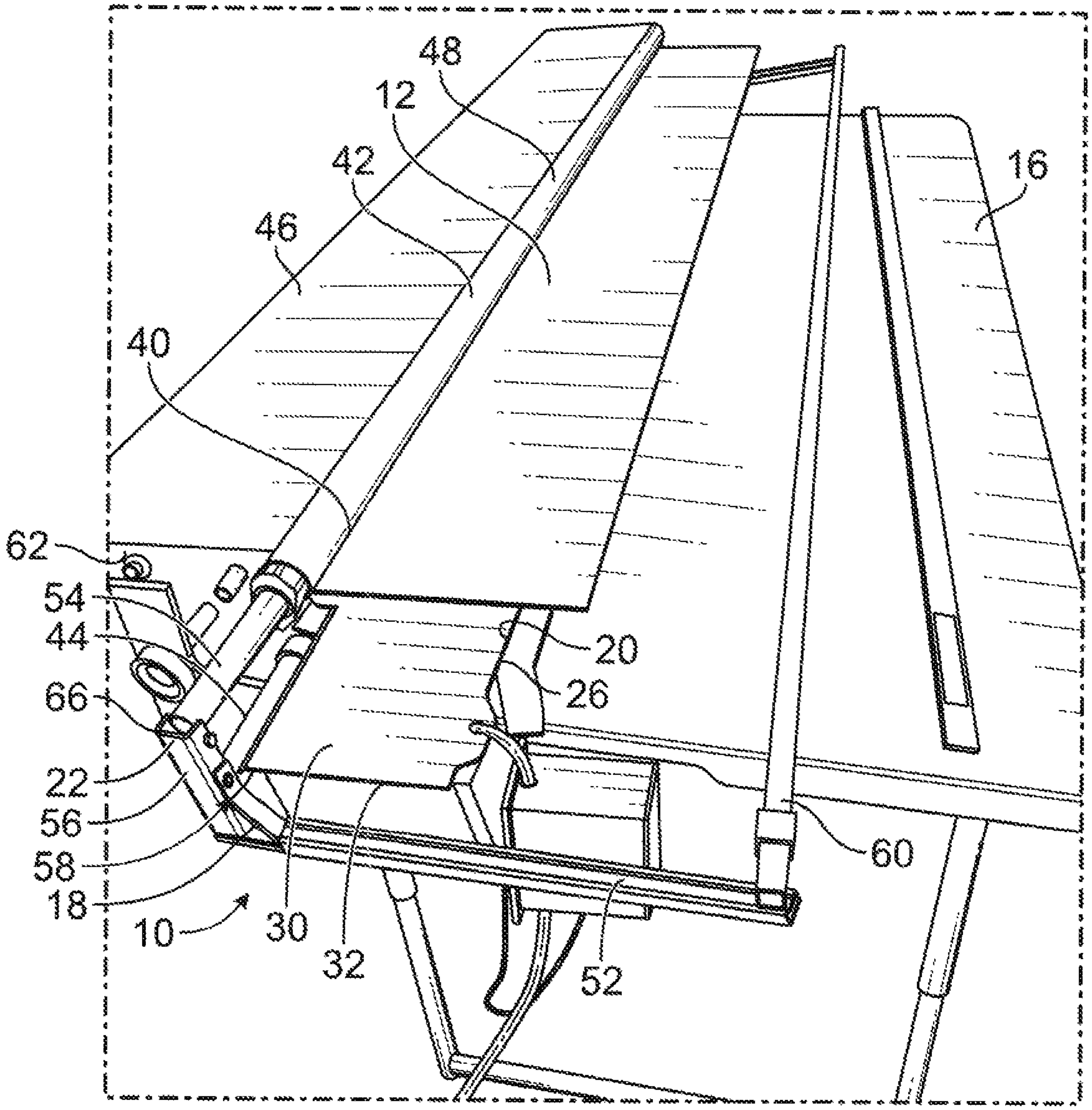
FIG. 4 illustrates in perspective the portable apparatus of the present invention with the front end of the vinyl composite member ready to be heated prior to being bent into a nose configuration.

FIG. 4 illustrates in perspective the portable apparatus 10 of the present invention with the forward edge 14 of LVP member 12 ready to be heated prior to being bent into a nose configuration. To accommodate for the range of possible thicknesses of LVP member 12 and ensure proper positioning of roller assembly 28, LVP member 12 is positioned onto and across the upper cover of 30 of heat housing member 26 and forward edge 14 is wedged into gap 40 formed between the outer surfaces 48 and 50 of the first and second rotatable cylindrical bars 42 and 44. One can elect to determine proper sizing of gap 40 prior to or during the period in which heating element 34 is warming to a predetermined temperature range.

Figure 5A:
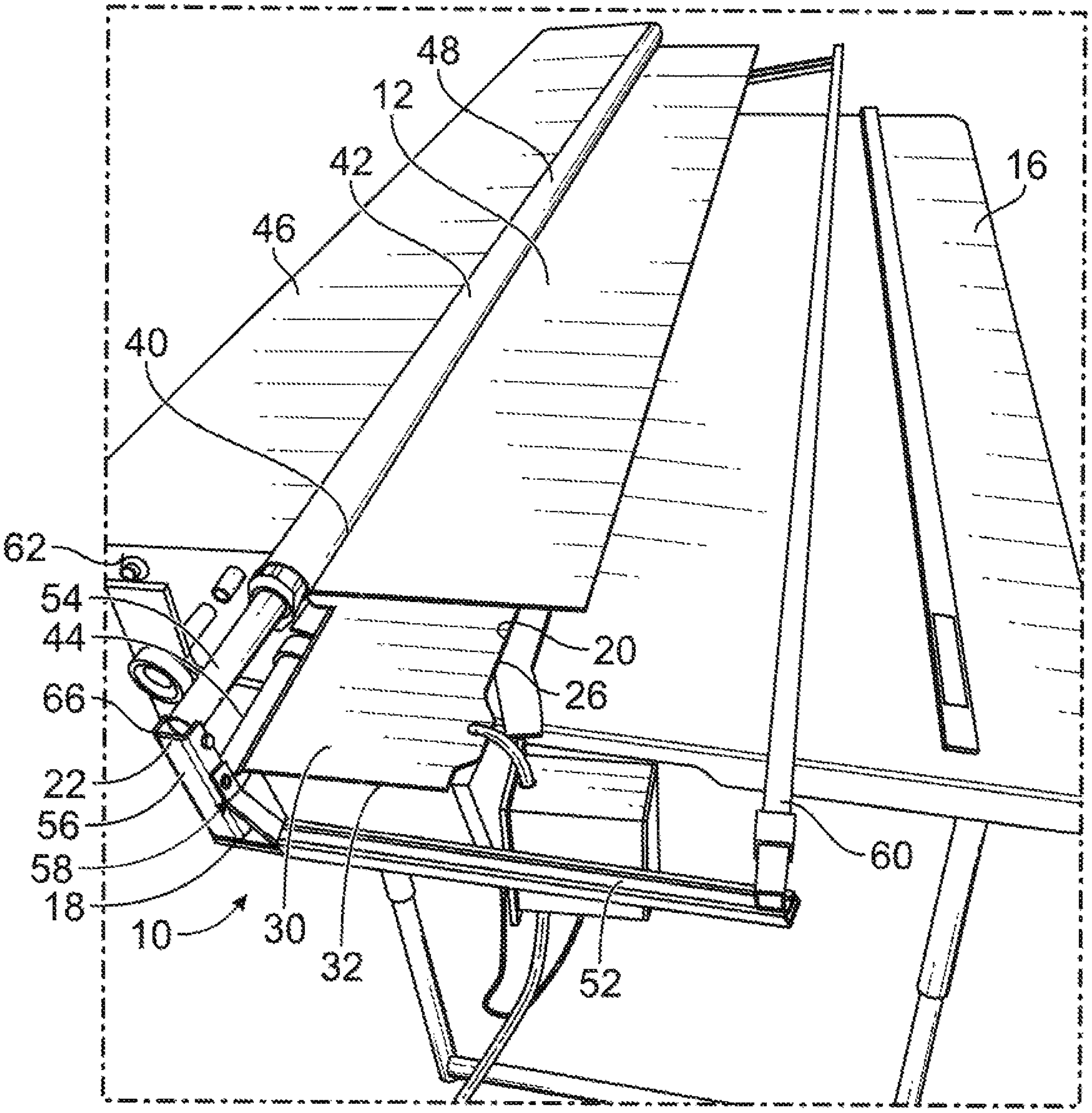
FIGS. 5*a*-5*d* illustrate the method for the application of arcuate contouring of a vinyl flooring plank to form a stair nose plank in accordance with the present invention.
Figure 5B:
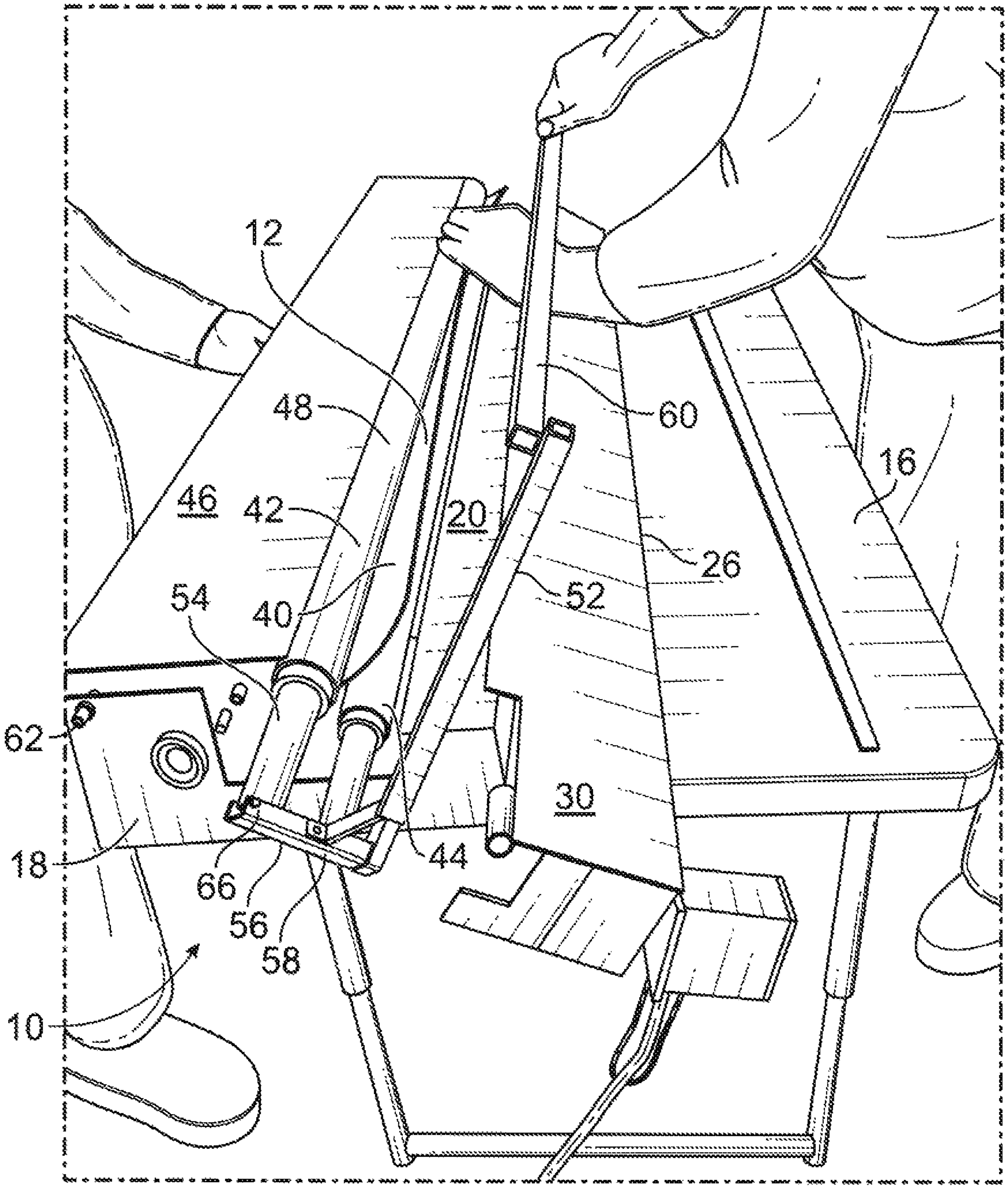
Figure 5C:
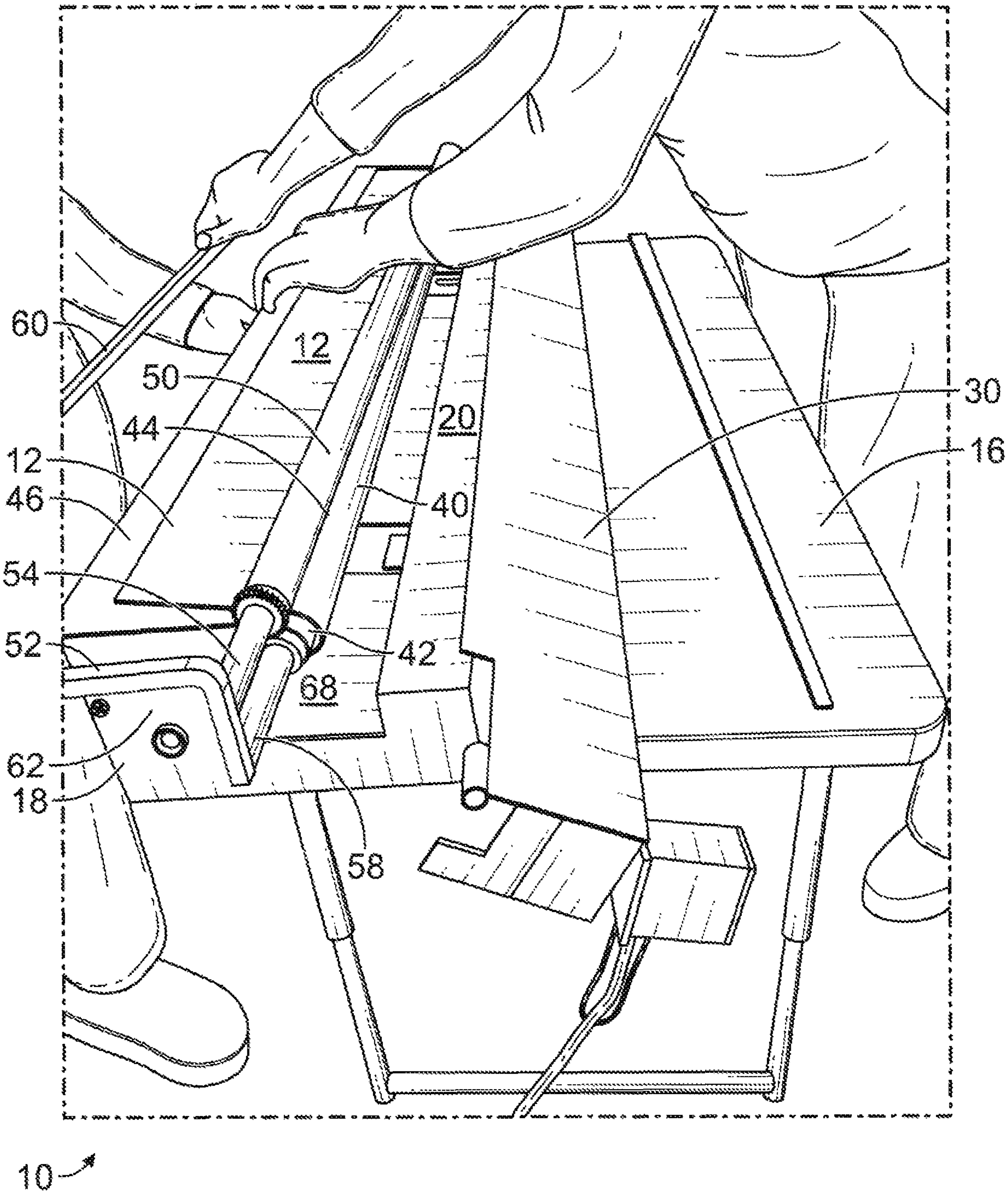
Figure 5D:
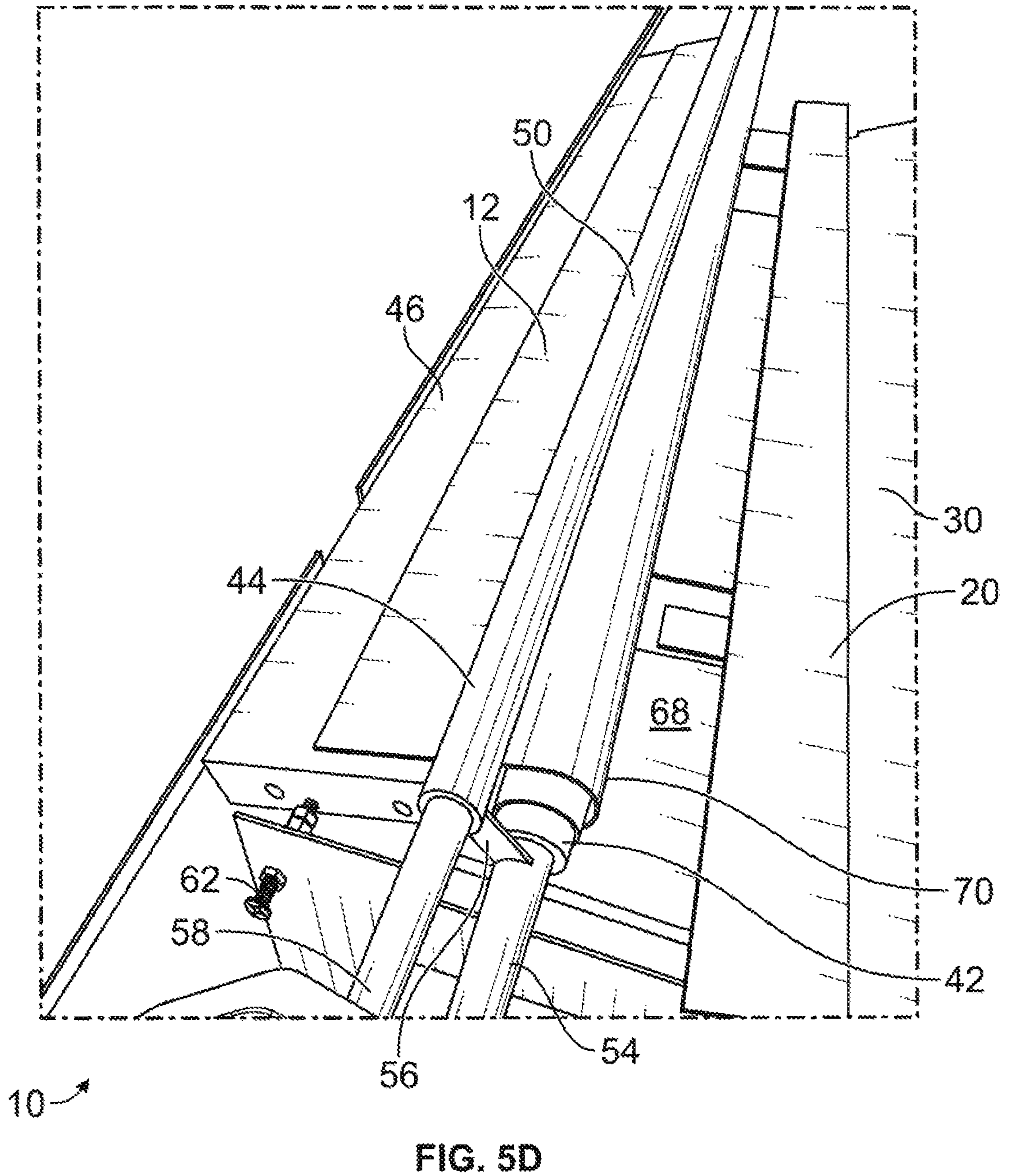

Referring to FIGS. 5*a*-5*d*, a method for the application of arcuate contouring of the forward edge 14 flooring plank 12 to form a stair nose is detailed and used to describe the operation of apparatus 10 of the present invention. Once the LVP member 12 is heated and sufficiently pliable, the heat housing member 26 is manually horizontally displaced via knobs 36 to prevent overheating of the LVP member 12. The operator then lifts operator arm 60, thus rotating linkage 56 and arm 52 about axle 54. Simultaneously, second cylindrical bar 44 move orbitally out of recess 68 and the outer surface 50 of the second cylindrical bar 44 engages the underside of LVP member 12 adjacent forward edge 14. As linkage 56 continues to be rotated by the operator, an upper side of the forward edge 14 of LVP member 12 engages outer surface 48 of first cylindrical bar 42, causing the front portion adjacent forward edge 14 of LVP member 12 to be formed into a curved nose portion, as seen in FIG. 5*d* at 70.

Figure 6:
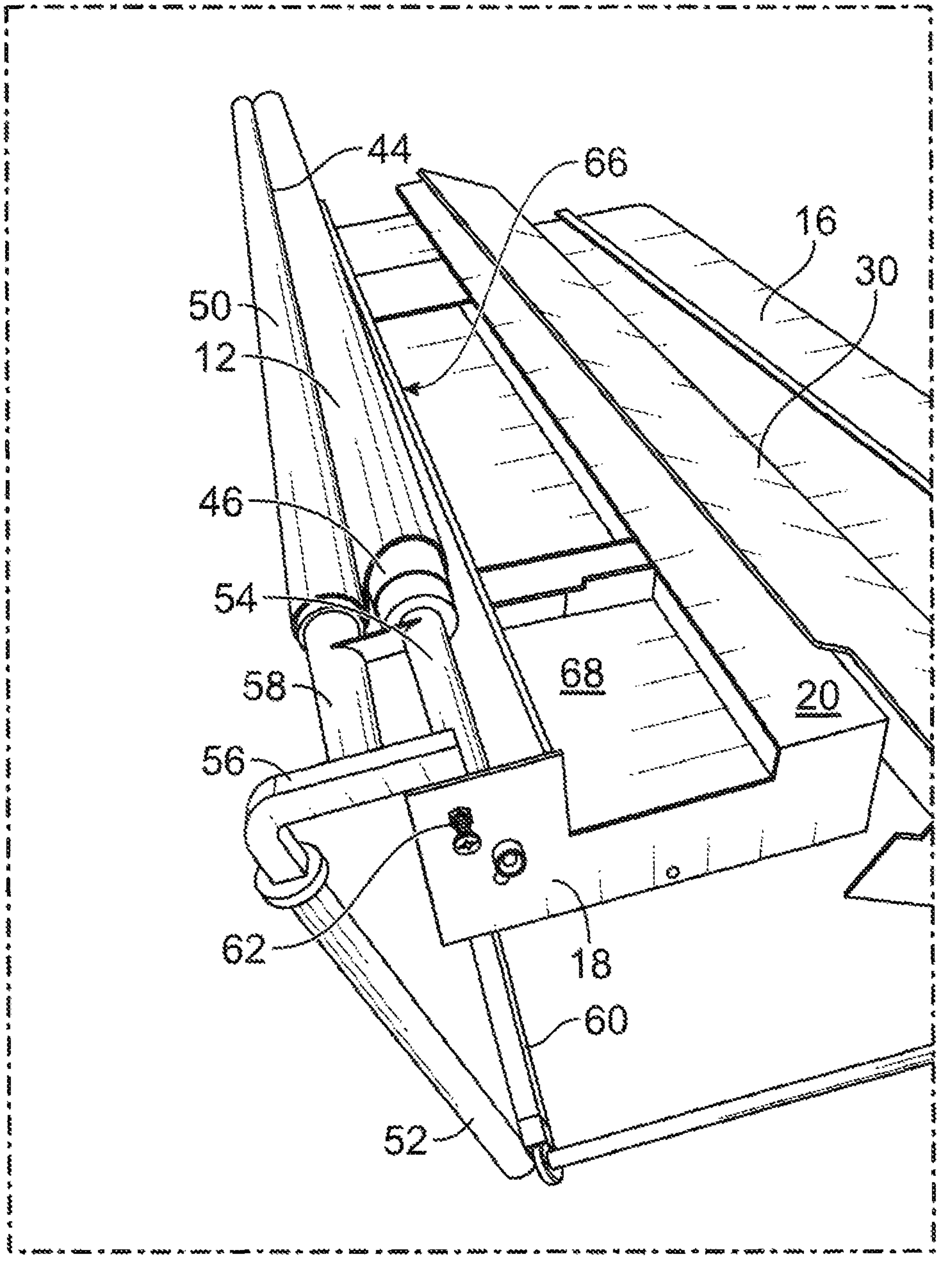
FIG. 6 illustrates a portion of the portable apparatus in a vertical configuration of the roller assembly with the curved portion of the vinyl composite member extending upward for application of a cooling agent to the heated curved nose portion.

Referring now to FIG. 6, by further rotation of actuator arm 52, forming member 46 is rotated about pins 62 and 64, a transitioning rotatable forming member 46 to a vertical position of 175° to 180° around the longitudinal edge of roller assembly 28. In this position, LVP member 12 is supported on and across an outer surface of forming member 46. An additional shim 72 member located in forming member 46 ensuring the vertical configuration is secure. In this vertical configuration, cooling agents such as a water spray for example, can be applied to the curved nose portion of LVP member 12. The LVP member 12 can then be removed from apparatus 10 by vertically lifting LVP member 12 off of forming member 46.

I claim:

1. A vinyl sheet heating and bending apparatus, comprising:

a frame member having substantially planar base member; the base member having an upper surface adapted to support the vinyl sheet;

a pair of vertical end plates removably mounted on each side of said frame member;

a heat housing member mounted within said base of said frame member configured to heat an end section of the vinyl sheet to a temperature within a predetermined temperature range;

a roller assembly rotatably supported between the vertical end plates, the roller assembly comprising a first and second cylindrical bar and a rotatable forming member, the roller assembly adapted to arcuately form said end section of said vinyl sheet around said first cylindrical bar when said end section of said vinyl sheet is heated to said predetermined temperature range forming a pliable end section of said vinyl sheet; and a rotatable actuator arm coupled to said roller assembly for displacing said roller assembly through a predetermined and adjustable distance, the second cylindrical bar rotatably attached to the rotatable actuating arm, rotation of the actuator arm rotating the outer surface of the second cylindrical bar in a spaced orbital direction relative to the outer surface of the first cylindrical bar.

2. The vinyl sheet heating and bending apparatus as recited in claim 1, where said heat housing member has an upper cover including a heating element and lower cover said lower cover including a gripping member, the gripping member configured to manually displace the heat housing member relative to the upper surface of said base of the frame member.

3. The vinyl sheet heating and bending apparatus as recited in claim 2, where said heating element is transversely spans the length of the upper cover of said heat housing member and the upper surface of said base member.

4. The vinyl sheet heating and bending apparatus as recited in claim 3, where said heat housing member further includes a variable temperature control coupled to the heating element, the variable temperature control configured to regulate the temperature of said end section of said vinyl sheet to said predetermined temperature.

5. The vinyl sheet heating and bending apparatus as recited in claim 1, where the first end plate and the second end plate include a first rotatable axle, the first cylindrical bar rotatably mounted on the first rotatable axle.

6. The vinyl sheet heating and bending apparatus as recited in claim 5, where said vertical end plates include a linkage pivotably rotatable around said first axle.

7. The vinyl sheet heating and bending apparatus as recited in claim 1, where each of said first and second rotatable cylindrical bars of said roller assembly includes outer surfaces longitudinally extending between and rotatable coupled to said end plates of said frame member.

8. The vinyl sheet heating and bending apparatus as recited in claim 7, where said outer surface of second rotatable cylindrical bar of said roller assembly is spaced a predetermined parallel distance from said outer surface of said first rotatable cylindrical bar of said roller assembly.

9. The vinyl sheet heating and bending apparatus as recited in claim 8, where said outer surface of second rotatable cylindrical bar of said roller assembly is spaced a predetermined parallel distance from said outer surface of said first cylindrical bar of said roller assembly forming a gap to receive said end portion of said vinyl sheet.

10. The vinyl sheet heating and bending apparatus as recited in claim 9, where the second rotatable cylindrical bar is rotatably attached to the rotatable actuator arm, rotation of the actuator arm rotating the outer surface of the second roller in the spaced circular orbital direction relative to the outer surface of the first roller.

11. The vinyl sheet heating and bending apparatus as recited in claim 10, where the rotatable actuator arm is attached to the forming member, and rotation of the actuator arm moves the forming member between a horizontal position and vertical position.

12. The vinyl sheet heating and bending apparatus as recited in claim 11, where rotating said forming member to the vertical position allows cooling of said vinyl sheet.

13. The vinyl sheet heating and bending apparatus as recited in claim 12, where said forming member is adapted to firmly secure the formed vinyl sheet to said forming member when the forming member is in said vertical position.

14. The vinyl sheet heating and bending apparatus as recited in claim 1, wherein the base comprises a recess, wherein the forming member of the roller assembly sits in the recess.

15. The vinyl sheet heating and bending apparatus of claim 1, wherein:

the heat housing member includes a transversely extending heating element, the heat housing member movable between a heating position and a retracted position.

16. The vinyl sheet heating and bending apparatus of claim 15, wherein:

in the heating position, the heating element is configured to be located beneath the end section of the vinyl sheet; and in the retracted position, the heating element is configured to be displaced away from the end section of the vinyl sheet.

17. The vinyl sheet heating and bending apparatus of claim 1, wherein:

each of the first and second cylindrical bars has an outer surface, the outer surface of each cylindrical bar being spaced apart forming a gap, the gap configured to receive the end sections of the vinyl sheet.

18. The vinyl sheet heating and bending apparatus of claim 1, wherein:

the rotatable forming member is mounted between the end plates and adjacent the first cylindrical bar.

19. The vinyl sheet heating and bending apparatus of claim 12, wherein:

a cooling agent is applied to a bent section of the vinyl sheet.

20. The vinyl sheet heating and bending apparatus of claim 9, wherein:

said gap is variably adjustable.

* * * * *